Dec. 26, 1939.          E. F. SPENCER                 2,184,402
                     NONLOCKABLE BUMPER GUARD
                       Filed April 3, 1937
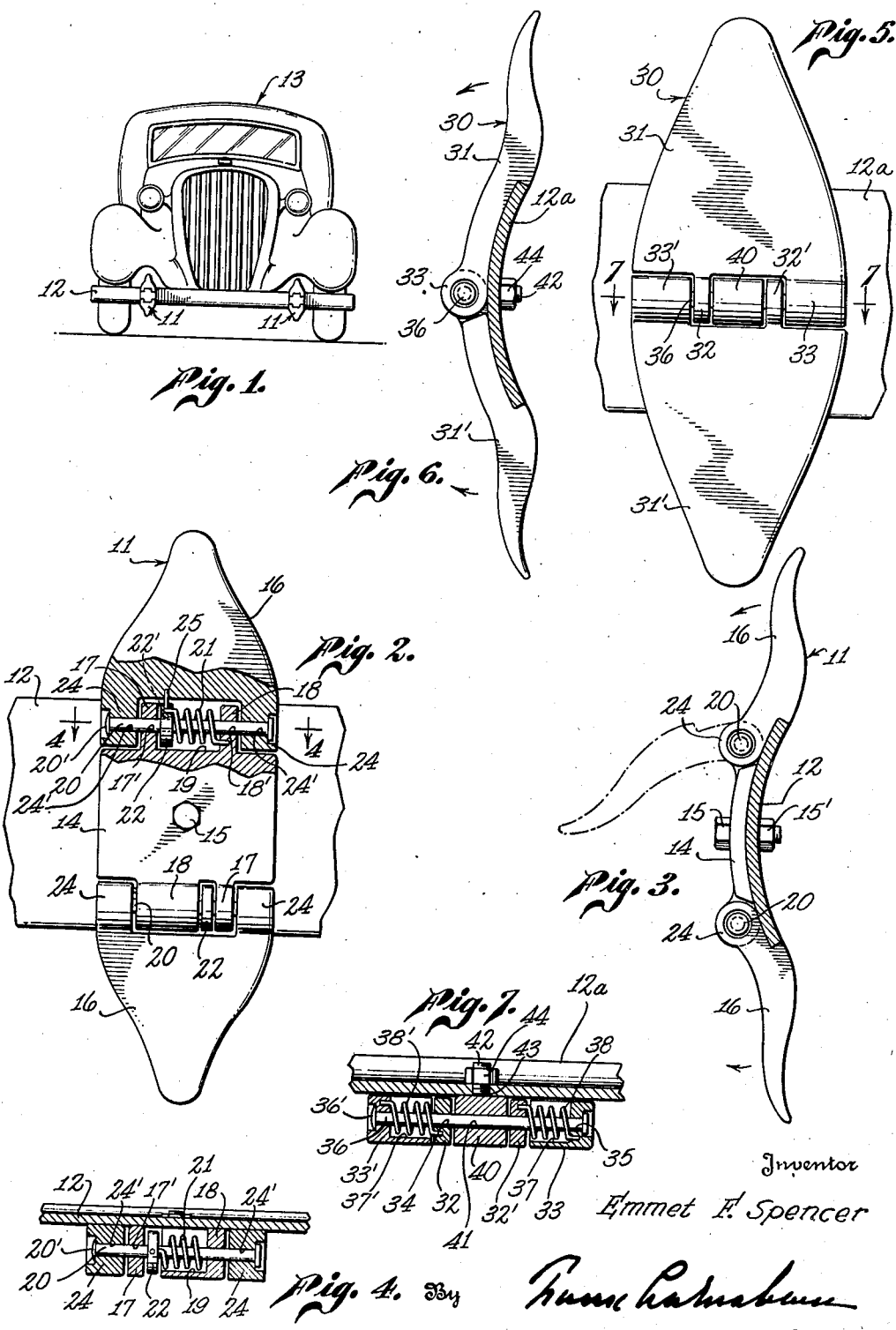
Inventor
Emmet F. Spencer Patented Dec. 26, 1939

2,184,402

UNITED STATES PATENT OFFICE 2,184,402

NONLOCKABLE BUMPER GUARD

Emmet F. Spencer, South Pasadena, Calif.

Application April 3, 1937, Serial No. 134,799

1 Claim. (Cl. 293—55)

This invention relates to bumpers such as are used on automobiles. The invention particularly relates to bumper guards which are attached to automobile bumpers and which extend vertically with relation to the bumper above and below it for the purpose of rendering the bumper effective against bumpers mounted on other automobiles at different heights.

It has been found in the present day automobile traffic that with the bumper guards now in use the bumper of one automobile very often slides either over or under the bumper guards of another and becomes locked or hooked behind the bumper guards. To disengage two automobiles which have become thus hooked it is necessary to depress one and raise the other while removing one bumper from the other. This is a distinct disadvantage and a considerable nuisance to automobile drivers. It is also true that with the present style of bumper guard such guards on the rear bumper often strike the ground as a car passes through a dip or when a car begins to ascend or has completed the descent of a particularly steep incline.

In view of the objectionable features of the present type of automobile bumper guards it is a primary object of this invention to provide an improved bumper guard which will effectively prevent the locking of automobile bumpers one behind the other and which will prevent the automobile upon which the guards are mounted from becoming hung or caught on uneven portions of the ground when the guards strike the ground. In order to accomplish this it is an object of this invention to provide a bumper guard which is rigid against any force tending to force it toward the automobile upon which it is mounted but which is adapted to yield to any force tending to pull it away from the automobile on which it is mounted, in a direction substantially parallel to the normal path of travel of the automobile and substantially parallel to the ground.

Specifically it is an object of this invention to provide a bumper guard having one or more guard members hingedly attached to a bumper and extending above or below the bumper. It is also an object of this invention to provide a neat appearing bumper guard in which the above mentioned features are incorporated which is of durable construction and which can be manufactured easily and inexpensively.

These objects are attained in the accompanying drawing, which is for illustrative purposes only, and in which:

Fig. 1 is a front elevation of an automobile showing two bumper guards of one form of the invention mounted on the front bumper of an automobile.

Fig. 2 is a front elevation of the form of the invention shown in Fig. 1. The figure is partly broken away to facilitate illustration of the construction.

Fig. 3 is a side elevation of the bumper guard of Fig. 2 mounted on a bumper, which is shown in section illustrating the manner in which the guard members of the bumper are adapted to pivot.

Fig. 4 is a section on line 4—4 of Fig. 2.

Fig. 5 is a front elevation of another form of bumper guard.

Fig. 6 is a side elevation of the bumper guard of Fig. 5.

Fig. 7 is a section on line 7—7 of Fig. 5.

Referring to the drawing, in Fig. 1 two of the bumper guards 11 of one form of the invention have been shown mounted on the front bumper 12 of an automobile 13. This illustrates the manner in which the bumper guards are designed to protect the automobile from the bumpers of other automobiles which may be of different height than the bumper on the first automobile by giving heighth and depth to the bumper.

Referring to Fig. 2 which shows one form of the invention, the bumper guard 11 comprises a supporting plate 14 which is mounted on the bumper 12 by means of a bolt 15 extending through it and through the bumper and carrying a nut 15' behind the bumper. Hingedly mounted at each end of the plate 14, or pivotally mounted, are guard members 16 which are identical in all respects and which constitute an extension of the plate 14.

It is contemplated that these guard members be pivotally mounted on the plate so that they are free to pivot forwardly of the bumper but are held rigidly and prevented from pivoting backward with respect to the bumper. The invention includes spring means for yieldably holding the pivotally mounted guard members 16 in the position in which they are shown in Figs. 2 and 3.

It is also contemplated that any ordinary means may be used for pivotally or hingedly attaching the guard members to the plate and that any type of spring construction may be used between the guard members and the plate for yieldably holding the guard members in the desired position. However, for the purpose of practical illustration, a particular construction has been shown which is effective and presents a desirable appearance.

The plate 14 has formed thereon at each end the projecting portions 17 and 18 which are apertured at 17' and 18' to accommodate a bolt 20. The plate has a cutaway portion or pocket 19 for the purpose of providing room for a coil spring 21, one end of which is secured in the portion 18 of the plate. The other end of this spring is secured in a circular plate 22 which is centrally apertured at 22' to accommodate the bolt 20.

Formed on the guard members 16 are the ears 24 each of which is provided with a central opening 24' for the reception of the bolt 20 which extends therethrough and through the portions 17 and 18 of the plate 14 and also through the circular plate 22 and through the center of the coil spring, thus holding the various parts in the positions shown. The bolt is riveted at 20', however a nut and bolt construction may be utilized in place thereof. A small pin 25 is secured in the plate 22 and extends into the guard members 16. It may merely rest against the front surface of the members 16, if desirable.

Referring to Fig. 3 it can be seen from the construction of the device that in view of the fact that the pivot pin 20 is located at a point below the outer margin of the bumper the bumper guard 16 abuts against the bumper 12 and is thereby prevented from pivoting backwards or toward the car upon which the bumper is mounted. The broken lines in Fig. 3 show the position to which the guard 16 may pivot. By reason of the fact that one end of the spring 21 is mounted in the plate 14 and the other end is mounted in the guard member 16 and actuated thereby, the spring is effective to yieldably hold the guard member in the position in which it is shown in the full lines in Fig. 3. If the guard member is pivoted or depressed to the position shown by the broken lines in Fig. 3 the spring is effective to return the guard to the full line position when the force which causes the guard to take the broken line position is removed.

By reference to Fig. 3 it can be seen that should the bumper of another automobile be caught behind the bumper guard 16 it is only necessary to withdraw or pull the "offending" bumper against the rear of the bumper guard and it will pivot to the position shown in the broken lines, thus permitting the "offending" bumper to slide over and away from the bumper 12. It should also be apparent that when traveling over uneven terrain the rear bumper guards will not catch or be caught upon the ground, but should they contact the ground will immediately pivot away from it.

In Figures 5, 6 and 7 another form of the invention is shown in which the bumper guard, generally indicated by reference numeral 30, comprises two guard members 31 and 31' mounted on a supporting member 40 which is attached to the bumper 12a. In this form of the invention the plate 14 of the form of the invention, previously described, is eliminated and a supporting member of relatively small size utilized in place thereof. The two guard members 31 and 31', which are identical in all respects, are hingedly or pivotally mounted with their inner ends adjacent each other.

Referring to Figures 5 and 7, the guard member 31 has formed thereon the extended portions or ears 32 and 33 which have holes 34 and 35 extending therethrough to accommodate the bolt 36. The extended portion 33 is cut out to form a pocket 37 for the reception of a coil spring 38 which has one end secured in the extended portion 33. Formed on the guard member 31' are extended portions or ears which correspond to the portions 32 and 33 of the guard member 31 and which are indicated by reference numerals 32' and 33'. The portion 33' has a pocket 37' to accommodate the coil spring 38' which has one end anchored in the portion 33'. The inner ends of springs 38 and 38' are secured in the ears 32' and 32 respectively of the guard members 31' and 31.

For mounting the guard members on the bumper 12a, a supporting member 40, apertured at 41, is provided. This member has a threaded stem 42 which extends through hole 43 in the bumper. A nut 44 secures the supporting member rigidly to the bumper.

By reference to Fig. 7 it can be seen that the bolt 36 extends through the holes in the extended portions 32 and 33 of guard member 31 and through the portions 32' and 33' of guard member 31' and through the supporting member 40. The bolt also extends through the springs 38 and 38' and thus serves to hold the springs and guard members in assembled position. The bolt is riveted at 36'.

By reason of the fact that one end of each spring is located in one guard member and the other end of each spring is located in the other guard member, the springs are effective to yieldably hold the guard members against the bumper 12a. If force is exerted against the rear side of either of the guard members sufficient to overcome the force of the spring, the guard member will pivot forwardly with relation to the bumper in a manner similar to the guard members of the other form of the invention.

The particular form of the invention shown in Figures 5, 6 and 7 has the advantage of presenting a neat appearance, of being simple in construction, and of having a large abutment area on the rear side of the guard members for engagement with the bumper to resist an object tending to force the bumper guard backward against the bumper.

I claim as my invention:

For use on an automobile bumper, a bumper guard comprising: a supporting member adapted to be attached to a bumper, said supporting member having an aperture therethrough; a pair of guard members having apertured ears formed thereon; a bolt extending through the ears of said guard members and through said supporting member; one of the ears of each of said guard members having a recess formed therein; a spring on said bolt in each of said recesses, each of said springs being attached at one end to an ear of one guard member and at the other end to an ear of the other guard member whereby said guard members are yieldably held against said bumper.

EMMET F. SPENCER.